United States Patent [19]

Shuman

[11] 4,329,800
[45] May 18, 1982

[54] ADJUSTABLE DISPLAY DEVICE

[75] Inventor: Bernard E. Shuman, Merrick, N.Y.

[73] Assignee: Eastern Electrical Equipment Co., Inc., Hicksville, N.Y.

[21] Appl. No.: 212,205

[22] Filed: Dec. 2, 1980

[51] Int. Cl.$^3$ .............................................. G09F 15/00
[52] U.S. Cl. ..................................... 40/606; 403/104; 403/107; 40/10 R; 40/607
[58] Field of Search ....................... 40/606, 607, 10 R; 52/165, 298

[56] References Cited

U.S. PATENT DOCUMENTS

| | | | |
|---|---|---|---|
| 294,493 | 3/1884 | Miner | 52/165 |
| 2,785,487 | 3/1957 | Hopp | 40/607 |
| 2,882,629 | 4/1959 | Moebius | 40/607 |
| 3,421,473 | 1/1969 | Weichendrieder | 40/607 |

FOREIGN PATENT DOCUMENTS

| | | | |
|---|---|---|---|
| 1046998 | 12/1958 | Fed. Rep. of Germany | 40/606 |
| 1803475 | 10/1968 | Fed. Rep. of Germany | 40/606 |
| 337565 | 5/1959 | Switzerland | 40/606 |

Primary Examiner—Gene Mancene
Assistant Examiner—Wenceslao J. Contreras
Attorney, Agent, or Firm—Darby & Darby

[57] ABSTRACT

A lightweight display device capable of vertical adjustment to desired height having a display frame attached to one end of a rod whose other end is formed with a pair of resilient arms having a plurality of teeth for the outer surface. The rod is positioned for ratchet-like vertical movement within a hollow tube having a threaded inner surface which engages with the teeth. The frame can be raised or lowered, along the length of the rod, by extending a vertical force thereto sufficient to deflect the arms of the rod away from the threads of the tube. When the vertical force is removed, the teeth re-engage with the threads to support the display frame at the desired height.

7 Claims, 3 Drawing Figures

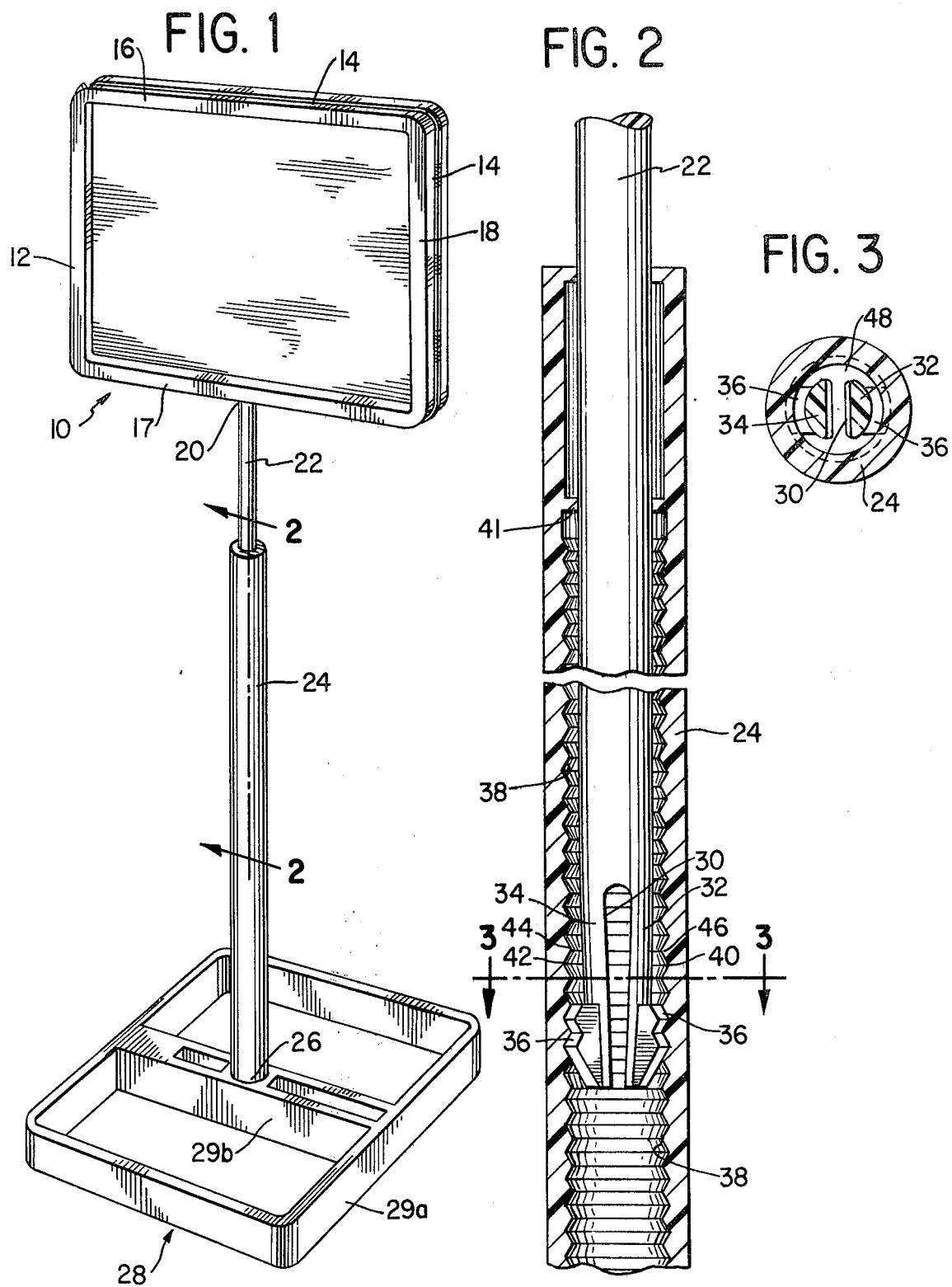

ADJUSTABLE DISPLAY DEVICE

BACKGROUND OF THE INVENTION

This invention relates to display device designed to be vertically adjustable and easily assembled.

Conventional display devices are commonly used to provide information in many types of commercial establishments such as banks, offices, airline terminals, trade shows and shops. To be most effective, the display device should be adjustable in height from the surface on which it rests so as to best be visible to the public. Many prior art display devices are non-adjustable being manufactured as integral units with fixed heights and frame areas. In prior art display devices which are vertically adjustable, the adjustment has conventionally been accomplished by a screw collar mechanism which fits over a sliding inner rod and outer tube. While such an arrangement is operative, it is viewable to an observer, thereby decreasing the aesthetics of the display and is also subject to difficulty in adjusting if the screw collar is fastened too tightly.

SUMMARY OF THE INVENTION

The present invention relates to a display device. The display device can be quickly assembled and disassembled. In a preferred embodiment, the component parts are made of plastic and are non-breakable under normal use.

In the preferred form of the invention, the display device is vertically adjustable to a number of different heights by a mechanism which is not visible on the outside of the device and which is easily operated by the application of a small amount of vertical force. In accordance with the invention a rod, supports and has attached to its upper end a display frame. The rod is formed at its bottom end with two resilient arms having a plurality of teeth on its outer surface which engage a threaded interior surface of a hollow tube into which the bottom end extend. When a sufficient vertical force is exerted on the frame and rod the arms deflect inwardly and away from the threads of the tube allowing the rod to move within the hollow tube to the desired height. When the frame is at the desired height the force is removed, the arms move apart and the teeth re-engage with the threads so that the rod becomes stationary within the tube.

It is, therefore, an object of the present invention to provide a vertically adjustable display device.

A further object is to provide an internal means for vertically adjusting the height of a display frame by means of a rod engaged within a hollow tube connected to a base.

Another object is to provide a display device having a vertically slidable rod with two deflecting arms having a plurality of teeth on their outer surface which teeth engage threads on the interior surface of a hollow tube forming a ratchet-like mechanism allowing the rod to engage and disengage from the tube upon the exertion of a suitable vertical force.

Other objects and advantages of the present invention will become more apparent upon reference to the following specification and annexed drawings.

DESCRIPTION OF THE DRAWINGS

FIG. 1 is an elevated perspective view of the adjustable display device;

FIG. 2 is a sectional view of a portion of the adjustment mechanism taken along lines 2—2 of FIG. 1; and FIG. 3 is a top view in cross-section along lines 3—3 of FIG. 2.

DESCRIPTION OF THE PREFERRED EMBODIMENTS

FIG. 1 shows a preferred form of the display device. The device includes a display frame 10 having continuously joined side pieces 12, 18 and top and bottom pieces 16. A slot 14 is cut in the top piece 16 and one side piece 18 to permit the insertion of a display message which can be in the form of a piece of paper or cardboard.

Frame 10 is supported by and attached to the upper end of a rod 22 which is attached to the lower piece 16 of the frame. The upper end of rod 22 can be either screw mounted or glued to the lower piece 17 of the frame.

The lower rod 22 extends downward from the frame into a hollow tube 24. The hollow tube is threaded on the outer surface of its bottom end 26 for screw mounting into a bracket in the base 28. The base is shown as being formed by an outer generally square framework 29a having a central crosspiece 29b. Other suitable shapes can be used. The open-work frame is preferred to reduce the overall weight of the device.

The display frame, rod, tube and base are preferably of a suitable plastic material, for example, polypropylene, nylon, ABS or other similar material. The frame and base can be manufactured by molding although it can be formed of strips which are bent or glued together.

The details of the rod 22 within the tube 24 are shown in FIG. 2. The lower end of the rod is notched at to produce two arms 32 and 34. Each of the arms has a set of several teeth 36 formed on its outer surface. Each arm and corresponding teeth extend outwardly from the surface of the rest of the rod. That is, the diameter of the peaks of the teeth 46 on the arms is greater than the diameter of the rest of the rod, for somewhat less than one half of the circumference of the rod. The width and height of the notch 30 is such as to permit a moderate amount of resiliency for the arms. That is, they can be deflected inwardly and will move when a sufficient vertical force is applied to the rod 22. The amount of force needed to deflect the arms can be adjusted by controlling the size and length of the notch.

FIG. 3 shows the details of the engagement of the teeth 36 within the threads 38 of the tube. The peaks of the teeth 36 fit into the valleys of the threads 38 of the tube and the peak of the threads of the tube mesh with the valley of the teeth. Since the teeth 36 protrude from the surface of the rod, the rest of the rod, except for the teeth, does not come into contact with the threads 38 of the tube either when the rod is stationary or when it is being adjusted but it remains spaced from the interior of tube 24.

To adjust the position of the rod a vertical force is exerted on it either in an upwards or downwards direction. This produces a horizontal force component which is exerted on the teeth 36 of the rod causing the arms 32 and 34 to deflect away from the threads 38 of the tube towards the notch 30. Thus, the arms 32, 34 move closer together allowing the rod to move within the tube in the direction of the applied force in a ratchet-like action.

When the vertical force on the rod is removed, the arms expand outwardly and the teeth 36 re-engage with the threads 38 of the tube.

Various rod and tube lengths can be used. The rod is prevented from being pulled out from the tube by a stop ridge 41 above the tube threads 38. The stop 41 extends into the tube to engage the teeth and prevent them from being moved inwardly.

In constructing the tube 24, it is preferred that a hollow tube be split into two sections and the threads 38 and ridge 41 be formed thereon while the sections are apart. The sections are then fastened together by a suitable adhesive or by heat or sonic sealing. The thread 26 at the bottom of the tube can be formed by making the bottom of the tube solid and then threading it.

What is claimed is:

1. A vertically adjustable display device comprising:
    a base,
    a hollow tube having means at the bottom thereof for mounting to said base,
    a rod having a portion disposed within said tube,
    said tube having a plurality of threads formed on its interior, and said rod being formed with a pair of resilient arms at the bottom end thereof, said arms each having a plurality of teeth on the outer surface thereof for engagement with the threads on the interior of said tube for supporting and adjusting the height of said rod relative to said tube, and
    a display frame attached to this top of said rod.

2. A display device as in claim 1, wherein application of sufficient vertical force on the rod causes the resilient arms to deflect the teeth away from the threads on the interior of the tube allowing the rod to be raised or lowered.

3. A display device as in claim 1, wherein the hollow tube is screw mounted to the base.

4. A display device as in claim 1, wherein the rod is screw mounted to the lower edge of the display frame.

5. A display device as in claim 1, wherein the display frame further comprises means for the insertion of a display message.

6. A display device as in claim 1, wherein the base, tube, rod and display frame are of plastic materials.

7. A display device as in claim 1, wherein the teeth on said resilient arms are formed as projections from the main portion of the rod and have a diameter greater than that of the main portion of the rod.

* * * * *